(12) United States Patent
Beune et al.

(10) Patent No.: US 6,513,201 B2
(45) Date of Patent: Feb. 4, 2003

(54) FASTENING DEVICE FOR A MOBILE TELECOMMUNICATION UNIT

(75) Inventors: Olivier Beune, Meudon (FR); Eric Vermelle, Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/887,123

(22) Filed: Jun. 25, 2001

(65) Prior Publication Data

US 2001/0054216 A1 Dec. 27, 2001

(30) Foreign Application Priority Data

Jun. 26, 2000 (FR) .............................................. 00 08152

(51) Int. Cl.[7] .................................................. A45F 5/00
(52) U.S. Cl. ............................ 24/3.2; 24/3.12; 24/3.11; 224/271; 224/197; 343/702
(58) Field of Search .................. 24/3.26, 3.2, 3.11–3.13, 24/455, 465, 464; 224/269, 197, 268, 666; 343/702

(56) References Cited

U.S. PATENT DOCUMENTS

| | | | | | |
|---|---|---|---|---|---|
| 1,348,718 | A | * | 8/1920 | Hoffmann | .................... 24/3.12 |
| 4,833,700 | A | * | 5/1989 | Seaburg | ...................... 455/74.1 |
| 5,584,423 | A | * | 12/1996 | Wang | .......................... 224/197 |
| 5,597,102 | A | * | 1/1997 | Saarikko et al. | ............. 224/191 |
| 5,620,163 | A | * | 4/1997 | Wu | ............................. 248/688 |
| 5,661,798 | A | * | 8/1997 | Chen | ........................... 379/446 |
| 5,906,031 | A | * | 5/1999 | Jensen | ......................... 24/3.11 |
| 5,986,608 | A | * | 11/1999 | Korisch et al. | ............. 343/702 |
| 6,081,695 | A | * | 6/2000 | Wallace et al. | .............. 24/3.11 |
| 6,141,417 | A | * | 10/2000 | Lopez et al. | ................. 379/446 |
| 6,252,555 | B1 | * | 6/2001 | Burton | ........................ 343/702 |
| 6,304,221 | B1 | * | 10/2001 | Brown | ......................... 343/702 |
| 6,364,187 | B1 | * | 4/2002 | Castellano et al. | ......... 224/236 |

FOREIGN PATENT DOCUMENTS

| | | |
|---|---|---|
| DE | 197 08 120 C1 | 6/1998 |
| DE | 2299 19 620 U1 | 3/2000 |

* cited by examiner

Primary Examiner—Robert J. Sandy
Assistant Examiner—André L. Jackson
(74) Attorney, Agent, or Firm—Sughrue Mion, PLLC

(57) ABSTRACT

The invention relates to a fastening device for a mobile telecommunication unit, including means for coupling said device to the unit and means for fastening the device to a garment or a belt. According to the invention, the unit includes an orifice with at least one connector for connection to an external automobile vehicle antenna and the coupling means are conformed to be able to cooperate with the orifice and cover the connector.

18 Claims, 3 Drawing Sheets

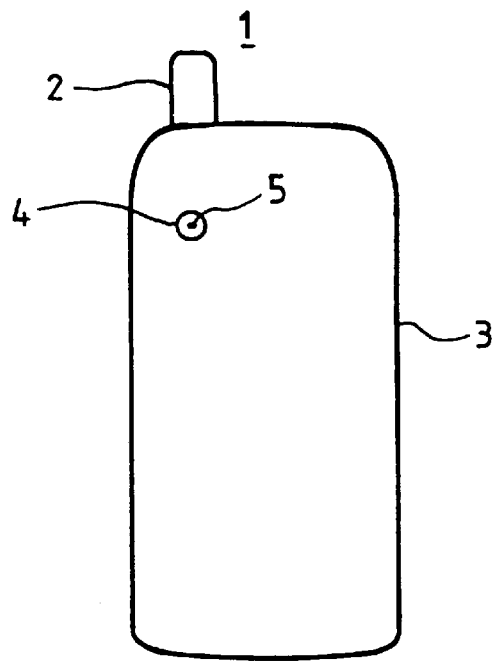
FIG_1
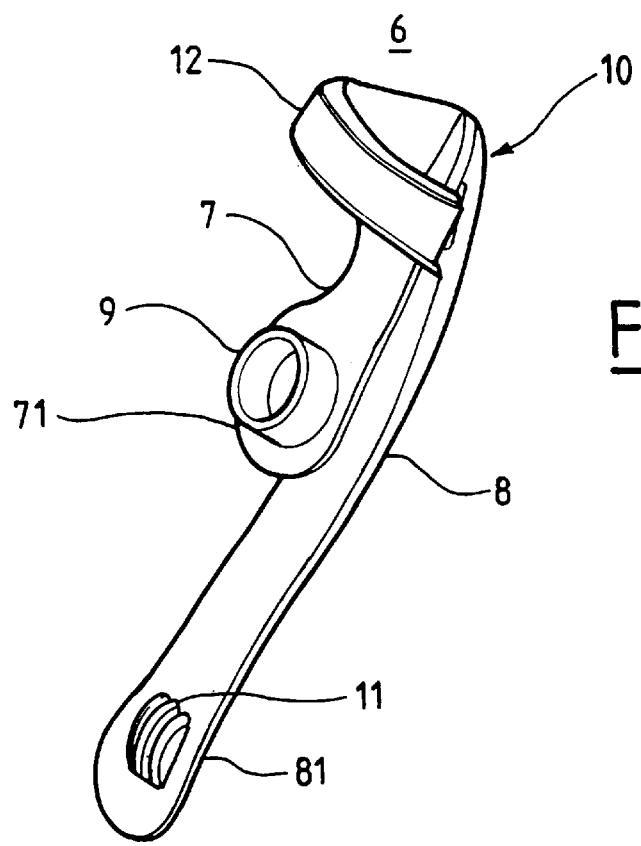
FIG_2

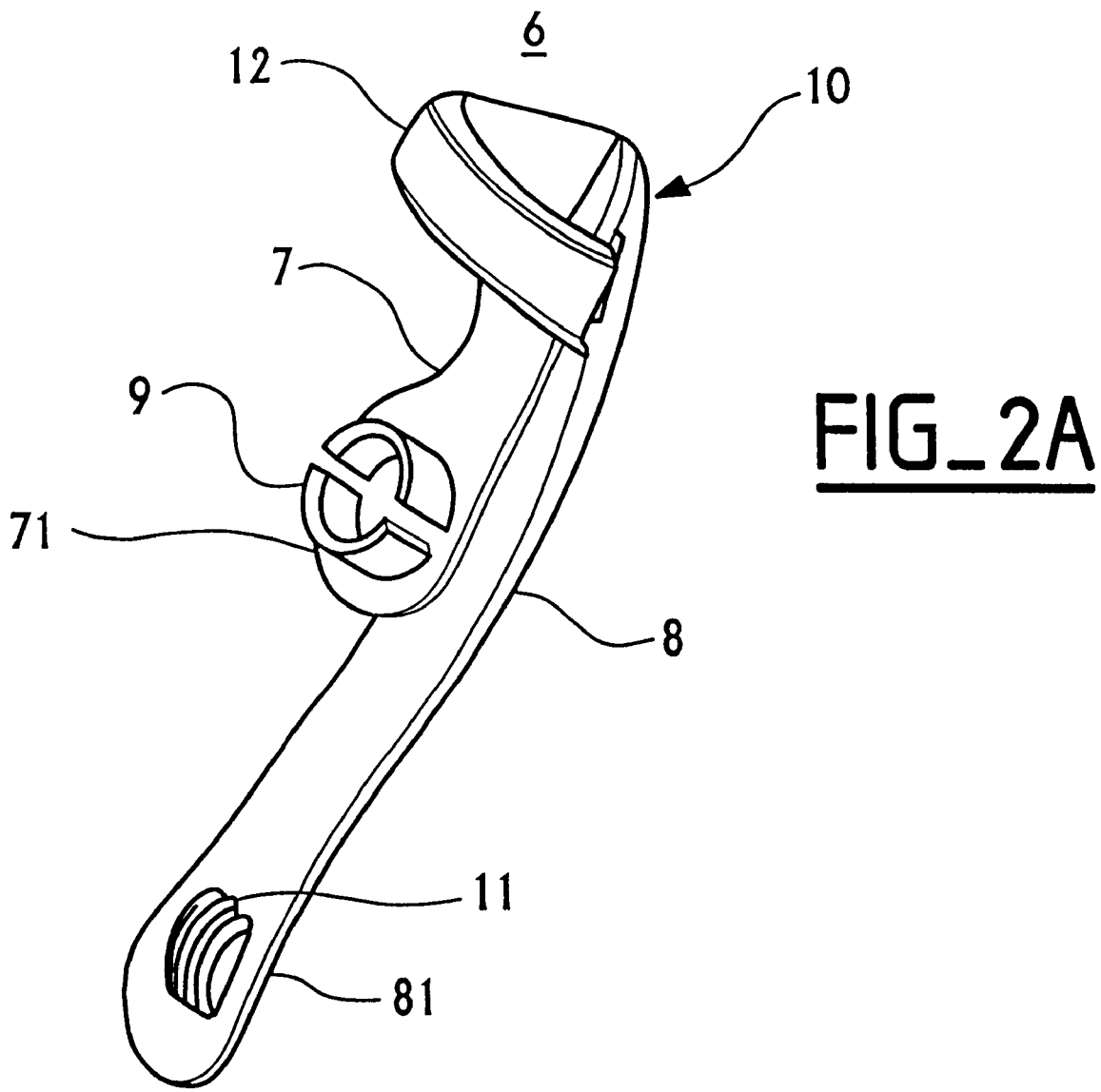

FIG_3
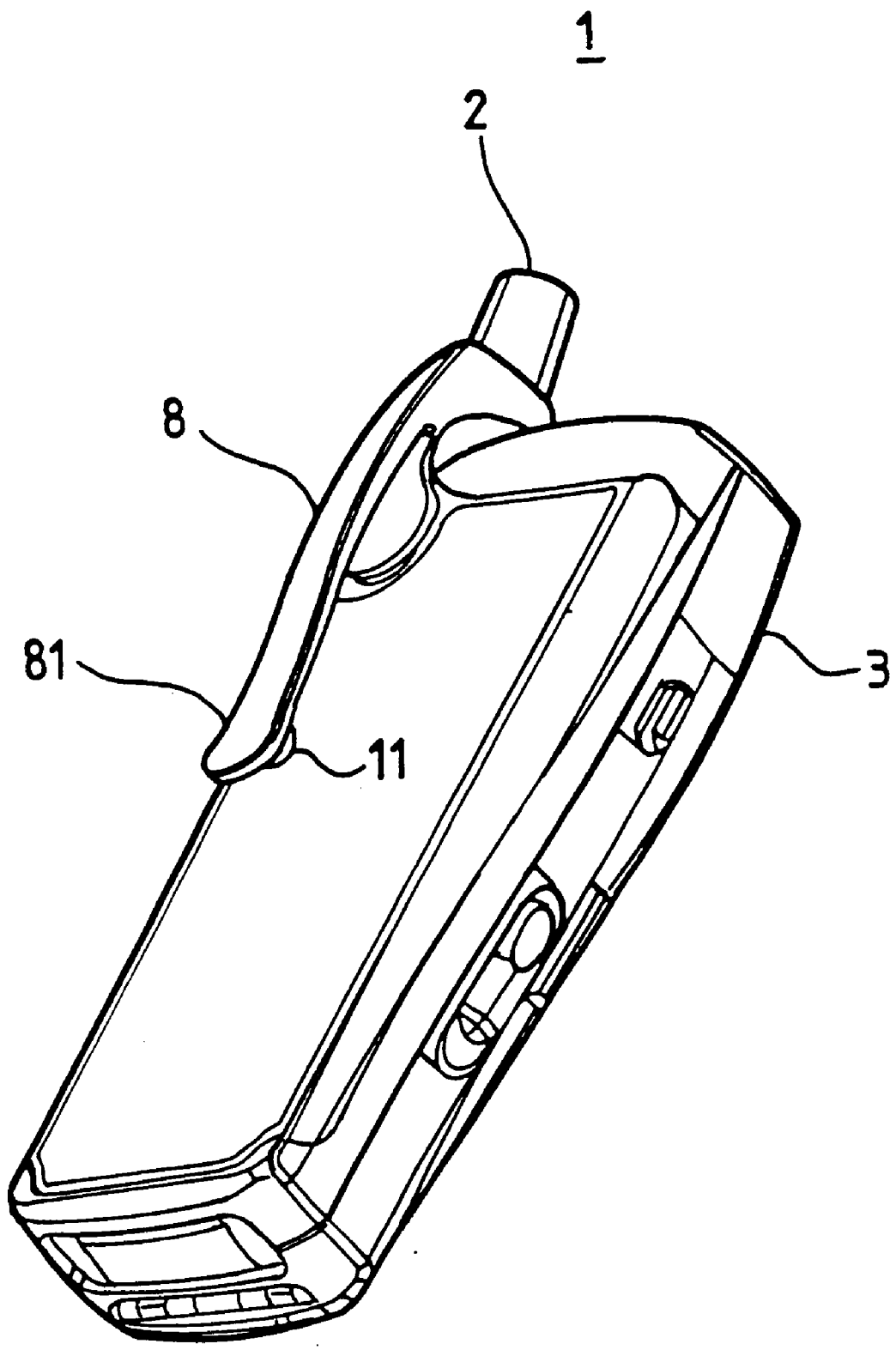

FASTENING DEVICE FOR A MOBILE TELECOMMUNICATION UNIT

The present invention relates to fastening devices for mobile telecommunication units and more particularly to a fastening device including means for coupling said device to the unit and means for fastening the device to a garment or a belt.

BACKGROUND OF THE INVENTION

Fastening devices, usually called pocket clips, are routinely used to fasten a mobile telephone into a jacket or shirt pocket or onto the belt of the user.

A pocket clip generally has a body including means which cooperate with corresponding means on the rear face of the telephone to couple the clip and the telephone together. The clip also has a tongue which the user can depress to release the fabric or the belt. Thus the clip, when fastened to a belt, for example, is secured to it by the weight of the unit to which it is attached.

However, that kind of clip is an accessory that merely provides a telephone with the fastening function as just described.

OBJECTS AND SUMMARY OF THE INVENTION

An object of the invention is to associate the fastening function of a fastening device as defined in the preamble of this application with a second technical function which in the prior art is provided by a separate accessory.

To this end, the invention provides a fastening device for a mobile telecommunication unit, which device includes means for coupling it to the unit and means for fastening it to a garment or a belt, wherein the unit includes an orifice with at least one connector for connection to an external automobile vehicle antenna and the coupling means are conformed to cooperate with the orifice and cover the connector.

Thus the invention provides a replacement for the protective stopper that is usually placed in the orifice when the latter is not in use. This removes the need for the stopper and has a particular advantage for manufacturers, who no longer need to manufacture and supply such stoppers, and equally for end users, who are no longer distracted by worrying about losing such a small accessory.

In addition to the fastening function, the invention provides a function of protecting the RF connector from impact and from the loss of signal that could result therefrom if the orifice were open when not in use. Also, because the coupling means of the invention cooperate and cover the RF connector, the latter is also hidden, which improves the appearance of the device and adds to its commercial success.

In an embodiment, the connector is a plug and the coupling means include a coupling sleeve.

In an embodiment, the coupling means include a plurality of arcs along the perimeter of a circle.

An embodiment of the device of the invention includes a branch adapted to be coupled to the unit by said coupling means and a branch adapted to be fastened to a garment or a belt by said fastening means, the two branches are connected at a common first end, and the second end of the branch adapted to be coupled to the unit is free and has coupling means on its outside face.

In an embodiment, the construction and the shape of the free end of the branch adapted to be fastened to a garment or a belt are such that it can exert a clamping force in the other direction when a garment or a belt is introduced between the two branches.

In an embodiment, the branch adapted to be coupled to the unit is shorter than the branch adapted to be fastened to a garment or a belt, the two branches are substantially parallel over a common length and the remaining portion of the longer branch as far as its free end is curved towards the other branch so that said free end is in substantially the same plane as the shorter branch.

In an embodiment, in order to accentuate said clamping force, the free end of the branch adapted to be fastened to a garment or a belt includes means for reducing the gap between that end and the rear face of the unit when the fastening device according to the invention is coupled to the unit. For example, the means for reducing the gap consist of projecting portions on the inside face of the branch adapted to be fastened to a garment or a belt and conformed to contribute uniformly to the clamping force.

An embodiment of the device of the invention includes means for securing said device to the unit.

In an embodiment, the holding means consist of a rigid collar adapted to surround an external antenna of the unit.

BRIEF DESCRIPTION OF THE DRAWINGS

The invention will be better understood on reading the following description and examining the accompanying drawings. The drawings are provided by way of non-limiting example of the invention. In the drawings:

FIG. 1 is a rear view of a conventional mobile telephone,

FIG. 2 is a perspective view of an embodiment of a fastening device according to the invention, FIG. 2a is a perspective view of an embodiment of a fastening device having a coupling means with a plurality of arcs, and FIG. 3 is a rear perspective view of a mobile telephone fitted with the fastening device shown in FIG. 2.

MORE DETAILED DESCRIPTION

In this specification, components with identical functions are indicated by the same reference numbers in the various figures.

FIG. 1 shows the rear face of a conventional mobile telephone. It shows an external antenna 2 connected to a transceiver, not shown, and usually referred to as a transmitter, inside the casing 3 of the telephone and enabling bidirectional communication with the network. The antenna is usually covered with a plastics material for reasons of appearance and to protect it from impact, rain, etc.

The user of the telephone may be near an external antenna, for example in an automobile vehicle. To be able to send/receive a signal of better quality, an orifice 4 houses a radio-frequency connector 5 that can be connected to an external antenna of the vehicle via a coaxial cable. The connector 5 is connected to the transmitter of the telephone, enabling it to route call signals. The user generally employs a car kit which is fastened near the steering wheel and in which the telephone is conveniently placed. When the telephone is inserted in the car kit, an electrical connection is made between the connector and corresponding circuitry of the car kit, which circuitry is connected to a cable in turn connected to the antenna of the vehicle.

FIG. 2 is a perspective view of one embodiment of a fastening device 6 in accordance with the invention. The device has a first branch 7 and a second branch 8 longer than the first branch. The two branches are joined together at a common end 10 and their respective other ends 71, 81 are free ends. The branch 7 is designed to be coupled to the telephone 1 by means of a coupling sleeve 9 on the outside face of the free end of the branch 7 and which is inserted in the orifice 4 in the telephone 1, as shown in FIG. 3. The sleeve is in the form of a hollow cylinder whose diameter is such that it can be inserted in the cylindrical orifice 4, covering the connector 5 to protect it, as explained above. Of course, in other embodiments (See, e.g. FIG. 2a) coupling means other than the sleeve 9 can be envisaged, such as two half-moons, a plurality of arcs along the perimeter of a circle whose diameter is less than that of the orifice 4, to enable them to be inserted into the orifice.

The second branch 8 is in a plane substantially parallel to the first branch over the length of the first branch 7 and its remaining portion, as far as its free end 81, is curved towards the branch 7 so that the end 81 is in substantially the same plane as the first branch 7. Thus when the sleeve is inserted in the orifice, as shown in FIG. 3, and the fabric of the user's shirt is inserted between the two branches, the end 81 applies a clamping force to the fabric which presses it against the rear face of the telephone. The fabric is therefore clamped between the two branches and the back of the telephone and there is no risk of the telephone falling out of the pocket. The user can apply pressure in the opposite direction to release the fabric of the shirt. The clamping branch is designed to resist torsion effects as well as providing the clamping function. The device is molded in one piece from a plastics material, for example, which also means that it can be made by a single fabrication process. This is an additional advantage of the invention over the prior art, in which it was essential to fabricate the stopper separately.

The end 81 also has solid arcs 11 on its inside face that faces towards the branch 7. These arcs make a positive contribution to the clamping force applied to the garment disposed between the two branches by reducing the gap between the free end 81 and the rear face of the telephone.

The fastening device 6 has a retaining collar 12 at the common end of the two branches to make a rigid connection between the device 6 and the telephone. The user threads the collar over the top of the antenna 2 and pushes it down to the base of the antenna. Subsequent pressure on the back of the sleeve plugs the orifice 4 and produces the combination shown in FIG. 3, ready to be fastened to a garment or a belt.

Of course, the invention is not limited to the embodiment described above. As explained above, the coupling means can be of any kind. The arcs 11 on the inside face of the free end 81 can be replaced by any other means for reducing the gap between the end 81 and the rear face of the telephone. Means can even be added to the end 81 so that it adheres to the fabric of a garment or to a belt.

What is claimed is:

1. A fastening device for a mobile telecommunication unit, the device including means for coupling the fastener device to the unit and means for fastening the fastener device to a garment or a belt, wherein the means for coupling is for coupling to a radio-frequency connector orifice in the telecommunication, the radio-frequency orifice for selectively connecting the telecommunication to an external automobile vehicle antenna unit includes an orifice with at least one connector for connection to the external automobile vehicle antenna.

2. A device according to claim 1, wherein the connector is a plug and the coupling means include a coupling sleeve.

3. A device according to claim 1, wherein the coupling means include a plurality of arcs along the perimeter of a circle.

4. A device according to claim 1, including a branch adapted to be coupled to the unit by said coupling means and a branch adapted to be fastened to a garment or a belt by said fastening means, the two branches are connected at a common first end, and the second end of the branch adapted to be coupled to the unit is free and has the coupling means on its outside face.

5. A device according to claim 4, wherein the free end of the branch adapted to be fastened to the garment or the belt is configured to exert a clamping force in a direction towards the branch adapted to be coupled to the unit when a garment or a belt is introduced between the two branches.

6. A device according to claim 4, wherein the branch adapted to be coupled to the unit is shorter than the branch adapted to be fastened to the garment or the belt, the two branches are substantially parallel over a common length and the remaining portion of the longer branch as far as its free end is curved towards the other branch so that said free end is in substantially the same plane as the shorter branch.

7. A device according to claim 4, wherein the free end of the branch adapted to be fastened to the garment or the belt includes means for reducing the gap between that end and the rear face of the unit when the fastening device according to the invention is coupled to the unit.

8. A device according to claim 7, wherein the means for reducing the gap comprise projecting portions on an inside face of the branch adapted to be fastened to the garment or the belt and that are conformed to contribute uniformly to the clamping force.

9. A device according to claim 1, including means for securing said device to the unit.

10. A device according to claim 9, wherein the securing means comprises a rigid collar adapted to surround an external antenna of the unit.

11. A mobile telecommunication assembly, comprising:
    a mobile telecommunication unit having an orifice with a radio-frequency connector therein for selective connection to an external antenna; and
    a fastening device coupled to the mobile telecommunication unit;
    wherein the fastening device comprises a coupler that is configured to be inserted and secured into the orifice of the mobile telecommunication unit.

12. The mobile telecommunication assembly according to claim 11, wherein the radio-frequency connector is a plug and the coupler includes a coupling sleeve.

13. The mobile telecommunication assembly according to claim 11, wherein the coupler includes a plurality of arcs along the perimeter of a circle.

14. The mobile telecommunication assembly according to claim 11, wherein the fastening device includes a first branch on which the coupler is formed and a second branch configured to clamp on to a garment or a belt, and wherein the first and second branches are joined at a common first end, and the second end of the first branch is free.

15. The mobile telecommunication assembly according to claim 14, wherein the first branch is shorter than the second branch, the first and second branches are substantially parallel over a common length, and the remaining portion of the second branch is curved towards the first branch so that a free end of the first branch is in substantially the same plane as the second branch.

16. The mobile telecommunication assembly according to claim 11, further comprising a collar surrounding and secured to an external antenna of the mobile telecommunication unit.

17. The mobile telecommunication assembly according to claim 11, wherein the radio-frequency connector is in a rear face of the mobile telecommunication unit.

18. The mobile telecommunication assembly according to claim 11, wherein the fastening device includes a first branch on which the coupler is formed, a second branch configured to clamp on to a garment or a belt, and a collar surrounding and secured to an external antenna of the mobile telecommunication unit; wherein the first and second branches are joined at a common first end, and the second end of the first branch is free; and wherein the first and second branches and the collar are formed as an integrally molded one-piece construction.

* * * * *